Figure 1:
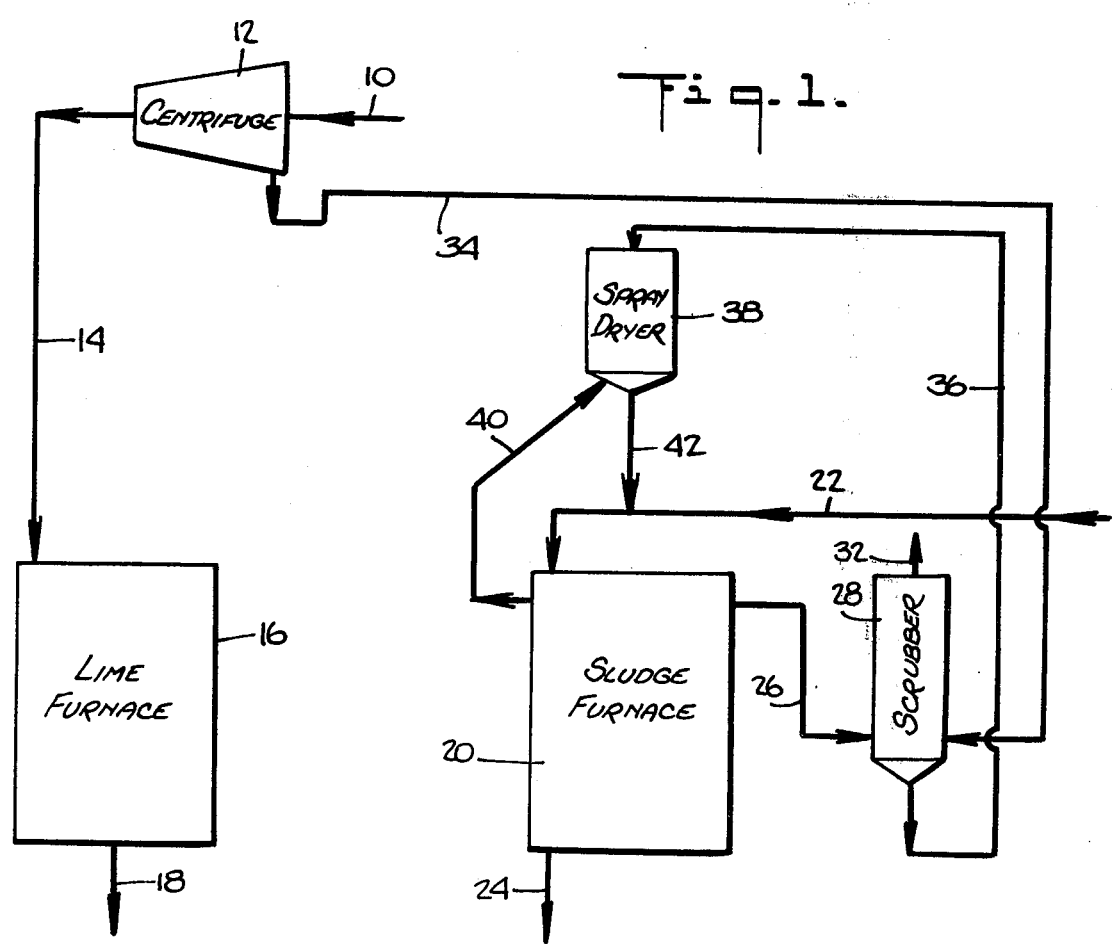

United States Patent [19]

Davy

[11] 4,145,278

[45] Mar. 20, 1979

[54] METHOD AND APPARATUS FOR SEWAGE TREATMENT PLANTS

[75] Inventor: Thomas E. Davy, Westfield, N.J.

[73] Assignee: Nichols Engineering & Research Corporation, Belle Mead, N.J.

[21] Appl. No.: 766,193

[22] Filed: Feb. 7, 1977

Related U.S. Application Data

[63] Continuation-in-part of Ser. No. 609,715, Sep. 2, 1975, abandoned.

[51] Int. Cl.² ........................... C02C 1/24; C02C 3/00
[52] U.S. Cl. ..................................... 210/10; 210/45;
210/67; 210/68; 210/73 S; 210/152; 110/235
[58] Field of Search .................... 110/8 R, 8 P, 15;
210/4–8, 10, 45–49, 66–68, 70, 71, 78, 73 S, 152

[56] References Cited

U.S. PATENT DOCUMENTS

| | | | |
|---|---|---|---|
| 3,342,731 | 9/1967 | Baumann et al. | 210/10 |
| 3,345,288 | 10/1967 | Sontheimer | 210/10 |
| 3,409,545 | 11/1968 | Albertson | 210/6 |
| 3,559,807 | 2/1971 | Reilly | 210/68 |
| 3,623,975 | 11/1971 | Cardinal, Jr. et al. | 210/67 |
| 3,996,133 | 12/1976 | Albertson | 210/67 |

*Primary Examiner*—Charles N. Hart
*Assistant Examiner*—Peter A. Hruskoci
*Attorney, Agent, or Firm*—Fitzpatrick, Cella, Harper & Scinto

[57] ABSTRACT

This invention relates to a method and apparatus for use in a sewage treatment plant, and is characterized by a centrifuge for receiving material precipitated by lime in the plant and for discharging a regenerable lime sludge, the centrifuge having a centrate stream of non-regenerable sludge, and means for drying the centrate stream with hot exhaust gases from a sludge furnace.

6 Claims, 2 Drawing Figures

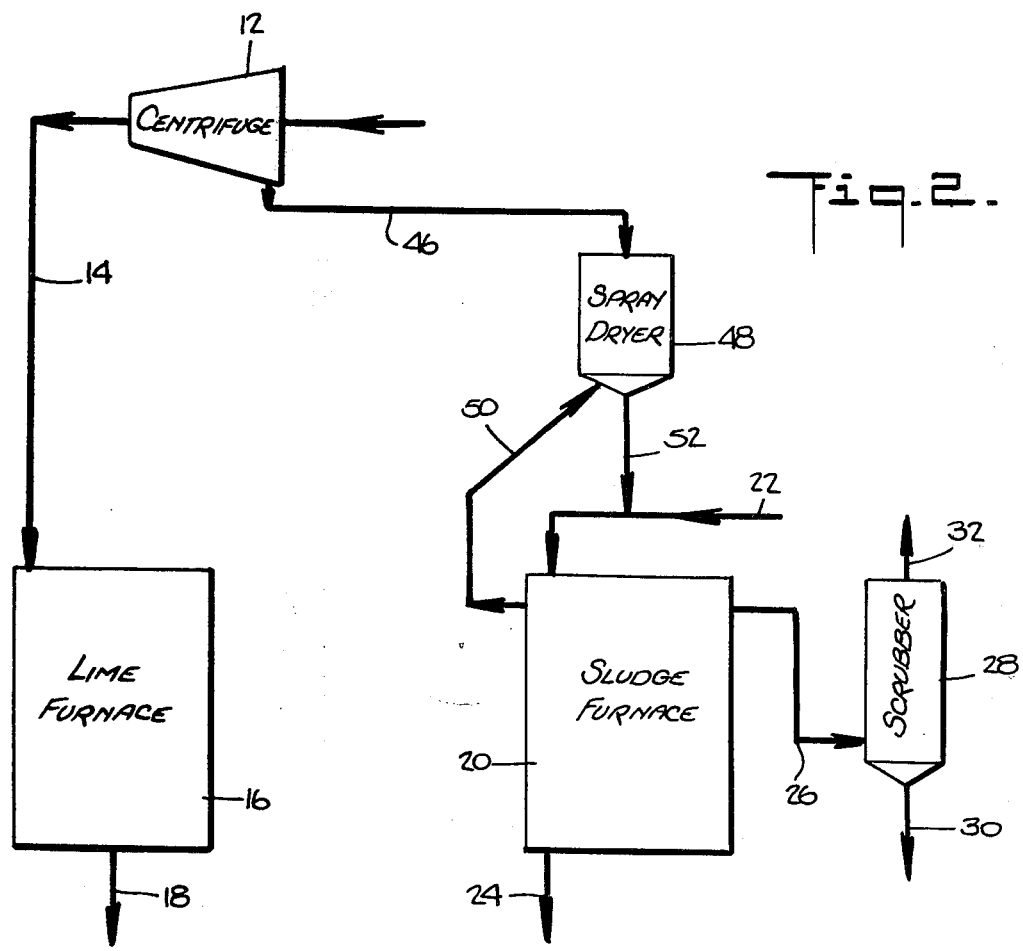

METHOD AND APPARATUS FOR SEWAGE TREATMENT PLANTS

This application is a continuation-in-part of my co-pending application Ser. No. 609,715, filed Sept. 2, 1975 now abandoned.

This invention relates to a system for sewage waste treatment, and more particularly to a method and apparatus for disposing of non-regenerable sludge separated, as by centrifuging, from regenerable lime sludge.

In standard raw sewage treating plants, such as a tertiary treating plant, it is common to have a lime treatment step either as part of the treatment, or as a separate later step. The material that is precipitated by the lime as the underflow, is treated mechanically, as by means of a bowl-type centrifuge, for example, to separate a first stream of regenerable lime sludge and a second stream of reject, non-regenerable sludge. Thus, it is known to convey the waste stream to a device such as a settling tank for removal of relatively large particles such as sand and grit from the stream, the residue being delivered to primary, secondary and tertiary settling tanks with a treatment chamber for activating overflow sludge flowing from the primary to the secondary settling tank. Activated sludge from the secondary settling tank is fed, along with sludge from the primary settling tank, to a sludge furnace although a portion of the secondary sludge may be recycled to the treatment chamber. In the tertiary settling tank phosphates are removed from the overflow from the secondary sludge settling tank by treatment with lime to give a pH of about 11 with recarbonation. The treated stream, containing of the order of 3 to 15% solids, is fed to a centrifuge which is operated with high losses to the centrate stream in order to obtain, in the centrate stream, the desired magnesium hydroxide $Mg(OH)_2$, hydroxylapatite $Ca5(PO4)30H$ and organic solids, leaving a high concentration of calcium carbonate in the cake which is then recalcined and recovered for reuse. However, it is not desirable to recirculate the centrate containing the $Mg(OH)_2$, $CA5(PO4)30H$ and organic solids with the cake to be recalcined because a buildup of these materials in the recovered lime will make it unusable.

Accordingly, a problem arises as to what to do with the centrate stream rejected from the centrifuge as being unsuitable for regeneration into lime. The present invention involves a novel combination of features combined in such a way as to afford a very efficient and effective solution of the aforesaid problem encountered with prior art systems, as will become apparent as the description proceeds.

In order to accomplish the desired results, I provide, in a sewage treatment plant including a sludge furnace, a combination characterized by a centrifuge for receiving lime mud, i.e. material precipitated by lime in the treatment plant, and for discharging a regenerable lime sludge, said centrifuge producing a centrate stream of non-regenerable sludge, and means for drying the centrate stream with hot exhaust gases from the sludge furnace. In one form of my invention, the means for drying the centrate stream includes a line for conveying the centrate stream from the centrifuge to a scrubber associated with the sludge furnace for use as the scrubbing liquid in said scrubber, means for conveying the centrate stream from the scrubber to a spray dryer, while providing means for conveying a porton of the hot exhaust gases and vapors from the sludge furnace to the spray dryer, and further includes a line for conveying the centrate stream dried in the spray dryer to the feed line for the sludge furnace.

According to another aspect of the invention, there is provided means for conveying the centrate stream of non-regenerable sludge from the centrifuge to a spray dryer which receives hot exhaust gas and vapors from the sludge furnace and means for conveying the centrate so dried in the spray dryer to the sludge furnace feed line.

Still further, according to the invention, there is provided, in a sludge waste treatment process, the steps of mechanically separating underflow material precipitated by lime into a first stream rich in material that can be reburned to lime and a second stream unsuitable for regeneration into lime, and thence drying the second stream in a spray dryer with hot exhaust gases from the sludge furnace.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures and methods for carrying out the several purposes of the invention. It is important, therefore, that this disclosure be regarded as including such equivalent constructions and methods as do not depart from the spirit and scope of the invention.

Several embodiments of the invention have been chosen for purposes of illustration and description, and are shown in the accompanying drawings, forming a part of the specification, wherein:

FIG. 1 is a flow diagram of a portion of a sewage treatment plant incorporating the concept of my invention; and FIG. 2 is a flow diagram similar to FIG. 1 but showing a second form of my invention.

In the embodiment of the invention illustrated in FIG. 1, material precipitated by lime as the underflow in a conventional sewage treating plant is introduced, as indicated at 10, into a centrifuge, such as a bowl-centrifuge 12. A plurality of sets of centrifuges connected in series may be employed, if desired. This mixture contains such materials as calcium carbonate, calcium phosphate, and the like, for example. The semi-solid product rich in material that can be reburned to lime is discharged from the centrifuge, as at 14. This semi-solid product contains from about 18% to about 25% solids, of which about 95% is calcium carbonate. This material is led to a lime furnace 16 and, thereafter, led via line 18 to a mechanical separator.

Still referring to FIG. 1, a conventional sludge furnace or incinerator 20 receives sludge from the clarifier system such as from the secondary settling tank mentioned above, via a feed line 22. The products of combustion are collected at the bottom of the furnace as indicated at 24, in the usual manner. The hot exhaust gases and vapors, after passing through the furnace are led, as indicated at 26, to a wet scrubber 28, which collects fly ash for controlling air pollution from the sludge furnace, a fly-ash slurry being discharged from the bottom via conduit 56, and clean gases being discharged at the upper end 32. The centrate stream 34 ejected from the centrifuge 12 is unsuitable for regeneration into lime. This is a dilute stream carrying from about 3% to about 15% solids, and is substantially void of calcium carbonate. Heretofore, this centrate stream was disposed of by pumping it directly into a river, or the like. However, in view of recent Environmental Protection Codes, it became necessary to provide a separate furnace to sterilize and destroy putreable matter adhering on the calcium phosphate, magnesium hydroxide and other mineral solids. The present invention solves the foregoing problem in a new and improved manner. In the form of the invention illustrated in FIG. 1, the centrate 34 is led to the scrubber 28 wherein it is used as the scrubbing liquid. This has the advantage that it avoids the necessity of using the aforementioned separate furnace to sterilize and destroy the putreable matter and it also avoids having to use clean water which would otherwise have to be led back to the front end of the treatment plant.

After the centrate 34 is used as the scrubbing liquid in the scrubber 28, where it is concentrated to from about 10% to about 20% solids, it is then fed via line 36 to a spray dryer 38. Instead of passing all of the hot exhaust gases and vapors from the sludge furnace 20 to the scrubber 28, a portion of these gases is led via line 40 to the spray dryer 38 to further dry the centrate to a final condition ranging from about 90% to about 60% solids. The centrate is then discharged at 42 and mixed into the sludge furnace feed line 22. By virtue of first passing the centrate to the scrubber, the spray dryer may be substantially smaller than would otherwise be required. Also, the heat from the sludge furnace, which would otherwise be wasted, is utilized to advantage.

In the embodiment of FIG. 2, the centrate is passed via line 46 from the centrifuge 12 to a spray dryer 48. Heat is furnished to the spray dryer in the form of hot exhaust gases and vapors from the sludge furnace 20 via line 50 provided for the purpose. The so dried centrate is then passed via line 52 to the sludge furnace feed line 22. Again, combustion products are collected at the bottom of the furnace for discharge at 24; and hot exhaust gases and vapors are led via line 26 from the furnace to wet scrubber 28 which discharges fly ash via line 30 and clean gas via line 32.

It will thus be seen that the present invention does indeed provide an improved sludge waste treatment process and apparatus which is superior in operability and efficiency as compared to prior art such systems.

Although certain particular embodiments of the invention are herein disclosed for purposes of explanation, various modifications, after study of this specification, will be apparent to those skilled in the art to which the invention pertains.

What is claimed and desired to be secured by Letters Patent is:

1. In a sewage treatment plant including a plurality of sludge treatment stations including settling means, a lime furnace and a sludge furnace, the combination comprising means for delivering sludge from at least one of said settling means to said sludge furnace, a centrifuge for receiving lime mud precipitated by lime in said settling means and for discharging a semi-solid product rich in regenerable lime sludge that can be reburned to lime, means conveying said semi-solid product from said centrifuge to said lime furnace for reburning, said centifuge providing a centrate stream unsuitable for regeneration into lime, a spray dryer having a centrate inlet, a hot gas inlet and an outlet, means for conveying said centrate stream from said centrifuge to said spray dryer via its centrate inlet, means for conveying a portion of the hot exhaust gases and vapors from said sludge furnace to said spray dryer hot gas inlet, said sludge furnace having a sludge inlet feed line, means for conveying a centrate stream discharged from said spray dryer outlet to said sludge inlet feed line.

2. A sewage treatment plant according to claim 1, further including a wet type scrubber, means for conveying a second portion of said hot exhaust gas from said sludge furnace to said scrubber, means for conveying the centrate stream from said centrifuge to said scrubber for use as scrubbing liquid in said scrubber, and means for conveying the centrate stream from said scrubber to said spray dryer.

3. A sewage treatment system including a plurality of sludge treatment stations including settling means comprising means including a sludge furnace feed line for delivering sludge from at least one of said settling means to a sludge furnace, a centrifuge, an inlet in said centrifuge for admitting lime mud thereinto precipitated by lime in another of said settling means, a first outlet from said centrifuge, a lime furnace, means connecting said first outlet and said lime furnace for discharging regenerable lime sludge from said centrifuge into said lime furnace, a second outlet for discharging a centrate stream of non-regenerable sludge from said centrifuge, a spray dryer having a centrate inlet, a hot gas inlet and an outlet, outlet means in said sludge furnace for conveying hot exhaust gas from said sludge furnace to said spray dryer via its hot gas inlet, means for conveying said centrate stream from said second outlet in said centrifuge into said spray dryer via its centrate inlet for contact with said hot exhaust gases from said sludge furnace whereby said centrate stream is dried by said hot gases, and means for conveying a centrate stream discharged from the spray dryer outlet to said sludge furnace feed line.

4. The invention as defined in claim 3, including a wet type scrubber, a second outlet in said sludge furnace, for said exhaust gas means connecting said scrubber to said second furnace outlet to pass said hot exhaust gas through the scrubber, means connecting the second outlet of the centrifuge to the scrubber to scrub said hot exhaust gas with said centrate steam, means for conveying the centrate stream from said scrubber to said spray dryer via its centrate inlet, said sludge furnace having a sludge feed line, and means for conveying the centrate stream dried in said spray dryer to said sludge feed line via said dryer outlet for burning in said sludge furnace.

5. In a sewage treatment system including a plurality of settling stations at least one of which produces a lime mud underflow and from at least one of which sludge is delivered to a sludge furnace, the process comprising passing the underflow lime mud precipitated by lime from at least one of said setting stations into a centrifuge, discharging from said centrifuge a first stream containing solids, the major constituent of which is calcium carbonate, passing said first stream to a lime furnace, passing a second stream from said centrifuge containing materials unsuitable for regeneration into lime to a spray dryer while simultaneously passing a portion of the hot exhaust gases and vapors from said sludge furnace to said spray dryer to dry said second stream, and passing the dried second stream containing solids from the spray dryer to a sludge feed line to said sludge furnace for burning.

6. In a sewage treatment system including a plurality of settling stations including settling tanks at least one of which produces a lime mud underflow and from at least one of which sludge is delivered to a sludge furnace, the process comprising passing the underflow lime mud precipitated by lime from at least one of said settling stations into a centrifuge, discharging from said centrifuge, a first stream containing solids, the major constituent of which is calcium carbonate, passing said first stream to a lime furance, passing a second stream from said centrifuge containing materials unsuitable for regeneration into lime to a wet scrubber associated with said sludge furnace, and using said second stream as the scrubbing liquid in said scrubber, and thence passing said second stream from said scrubber into a spray-type dryer while simultaneously passing a portion of the hot exhaust gases and vapors from said sludge furnace to said dryer to dry said second stream, and passing the dried second stream containing solids from the spray dryer to a sludge feed line to said sludge furnace for burning.

* * * * *

UNITED STATES PATENT AND TRADEMARK OFFICE
CERTIFICATE OF CORRECTION

PATENT NO. : 4,145,278
DATED : March 20, 1979
INVENTOR(S) : THOMAS E. DAVY

It is certified that error appears in the above-identified patent and that said Letters Patent are hereby corrected as shown below:

Column 2, line 66, change "56" to --36--.

Column 4, line 41, after "furnace" delete the ",";

Column 4, line 42, after "gas" insert a ",".

Signed and Sealed this

Eighteenth Day of September 1979

[SEAL]

Attest:

Attesting Officer

LUTRELLE F. PARKER
Acting Commissioner of Patents and Trademarks